A. W. ALTHOFF.
AUTOMOBILE WHEEL.
APPLICATION FILED NOV. 21, 1918.
1,314,727.
Patented Sept. 2, 1919
2 SHEETS—SHEET 2.
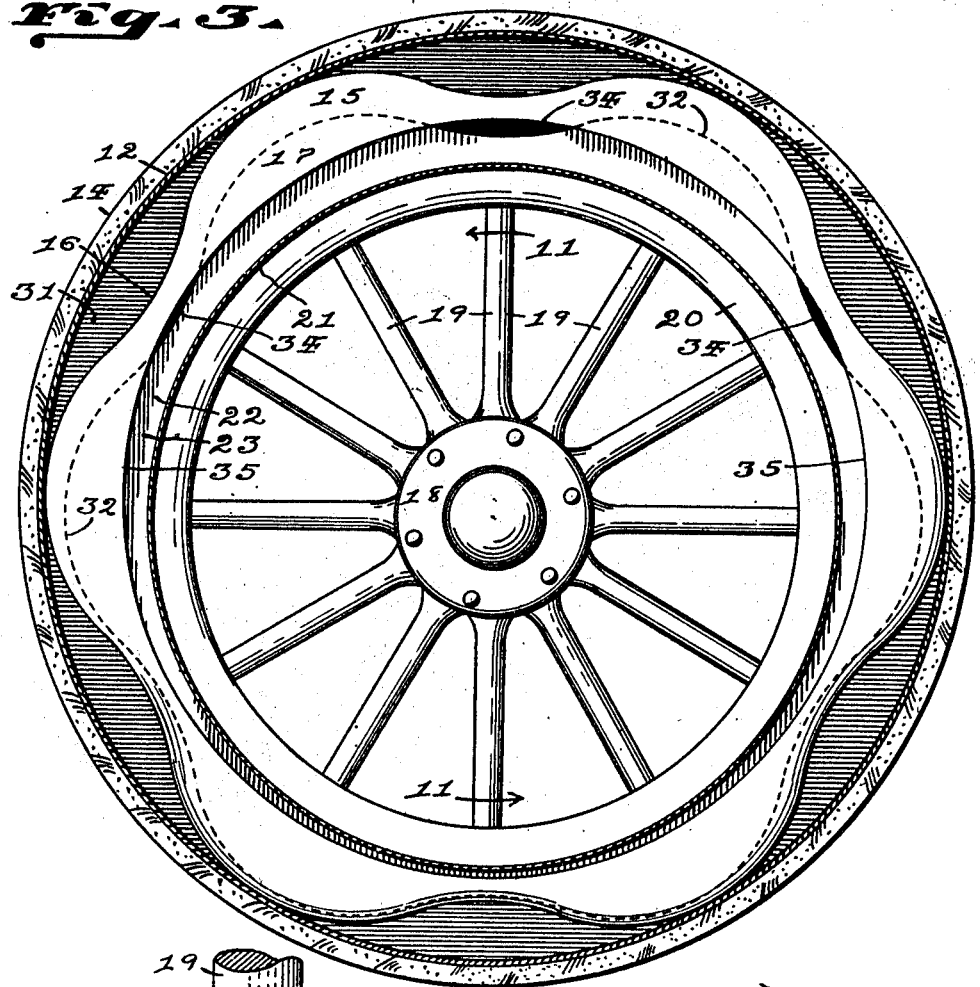
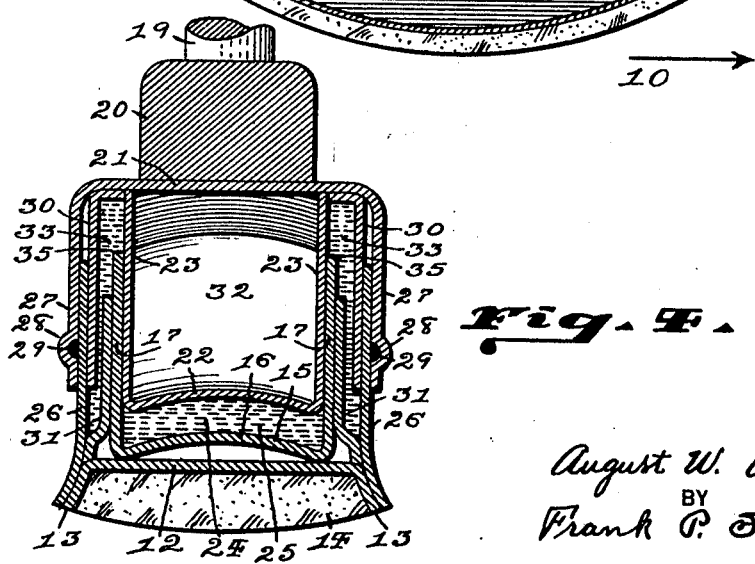
INVENTOR:
August W. Althoff.
BY
Frank P. Shepard.
ATTORNEY.

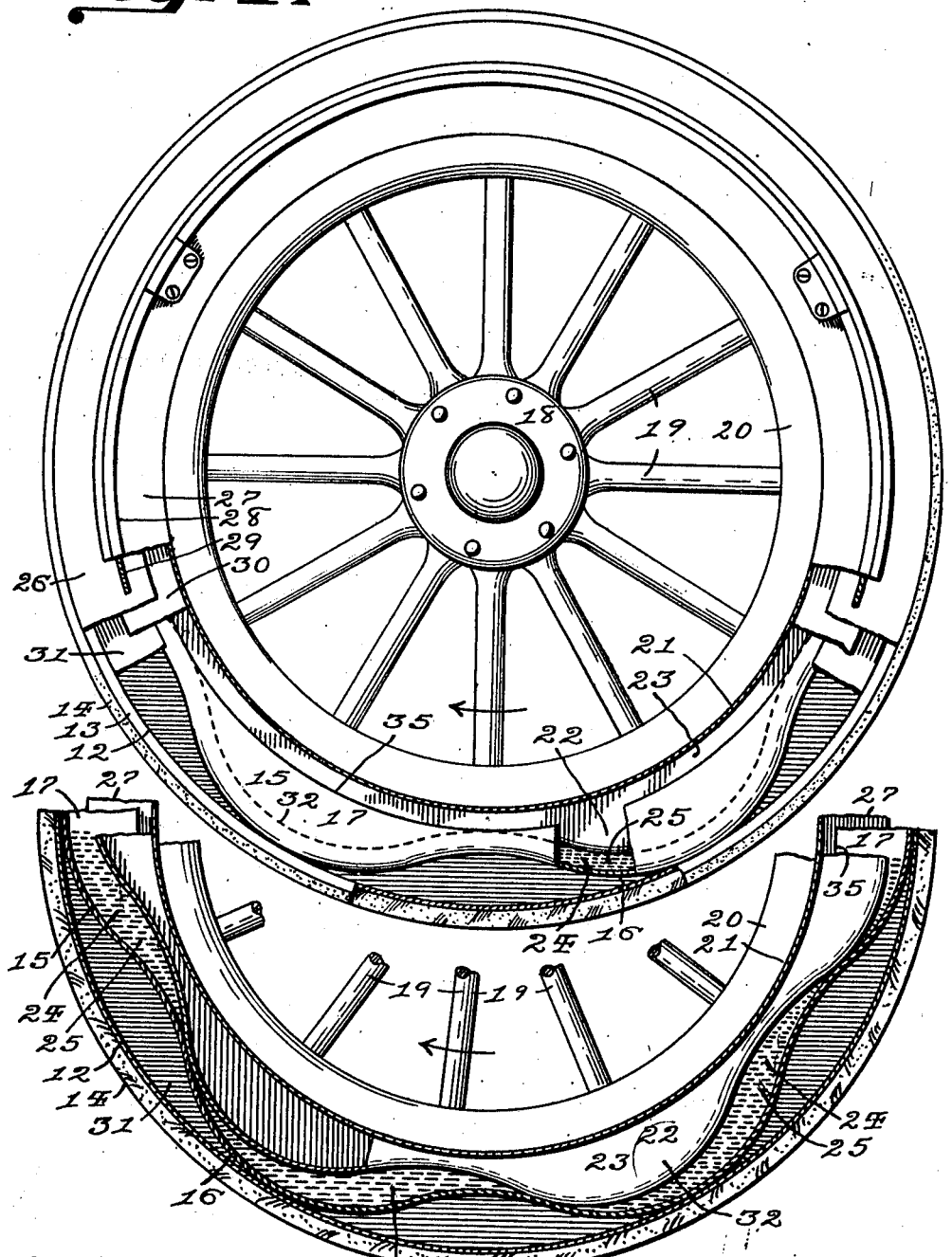

UNITED STATES PATENT OFFICE.

AUGUST W. ALTHOFF, OF OKLAHOMA, OKLAHOMA.

AUTOMOBILE-WHEEL.

1,314,727. Specification of Letters Patent. Patented Sept. 2, 1919.

Application filed November 21, 1918. Serial No. 263,602.

*To all whom it may concern:*

Be it known that I, AUGUST W. ALTHOFF, a citizen of the United States, residing at Oklahoma, in the county of Oklahoma and State of Oklahoma, have invented certain new and useful Improvements in Automobile-Wheels, of which the following is a specification, reference being had to the accompanying drawings.

The invention pertains to wheels of the floating-hub type, an object being to provide a wheel which will absorb shock.

Other objects and advantages of the invention will be set forth in the ensuing description.

The drawings show one of the practical forms in which the invention may be embodied.

Figure 1 is an elevation view of the wheel with portions broken away to expose interior construction.

Fig. 2 is a similar view of a portion of the wheel, but with parts in different relative position.

Fig. 3 is a similar view of the full wheel, but with the parts in still another position.

Fig. 4 is a cross-section view of the outer portion of the wheel on larger scale.

In Fig. 4 all parts which are connected together and move together are shaded in the same direction, with the exception of an extreme outer thread material on which the shading is clouded, and two packing cords which are shaded in solid black.

Like characters of reference designate like parts in all the figures.

In carrying out the objects stated, the improved wheel comprises two principal portions—an outer or thread portion whose inner surface is channeled, and an inner portion whose outer edge fits movably within the channel of the outer portion.

The diameter of the inner portion of the wheel is such that a space of, say, one-half inch in a thirty-four-inch wheel is left between its outer periphery and the bottom of the channel of the outer portion, thus allowing the inner portion one-half inch eccentric movement from normal central position during revolving movement of the wheel; and this space is filled with some yieldable free-moving substance, such, for example, as thick oil or a lubricant known on the market as "hard oil".

As the wheel travels forward in the direction of the arrow 10 in Fig. 3 the pressure of the inner portion of the wheel downward in the channel of the outer portion tends to, and does, crowd the oil around in the channel in the direction of the arrows 11.

The oil or other substance used in the channel should be of such character or consistency that while it will slowly yield to the presure of a light load on the inner portion of the wheel it will not too quickly yield to a heavy load. The oil will then act to absorb any shock brought upon the wheel by the load.

In the wheel shown in the present instance the outer part of the outer channeled portion consists of a strap-metal hoop 12 whose edges are flanged outwardly as at 13, the space between these flanges being filled with a suitable tread material 14.

As best shown in Fig. 4, the channel in the outer portion of the wheel is formed by a channel-iron ring 15 whose outer or back portion 16 is brazed to the outer hoop 12, the side walls 17 of this channeled ring projecting inward as shown.

The central portion of the wheel includes the usual hub 18; spokes 19; felly 20; and channel-iron rim 21 which may be shrunk onto said felly as usual.

The outer edge of the inner portion of the wheel, which is arranged to fit in the channeled ring 15 of the outer portion, consists of a channel-iron ring 22, the inner edges of whose side walls 23 are brazed to the channel-iron rim 21.

The space 24 left between the two channel-iron rings 15 and 22 is filled with the oil 25 above mentioned.

In further completing the wheel, an inwardly-extending wall 26 is brazed to each side of the extreme outer hoop 12 and extends with an oil-tight fit into the channel-iron rim 21 of the inner portion of the wheel, the side walls 27 of said rim 21 being grooved on their inner surfaces as at 28 and having said grooves filled with packing cord 29.

The channeled rim 21 may be provided with inner walls 30 in addition to its side walls 27, so that the walls 26 of the outer hoop 12 may slip between said walls 27 and 30 with a more oil-tight fit.

The channeled ring 15 may have its side walls 17 braced to the outer hoop portion 12 by bracing rings 31 which are brazed in place.

In order that the inner portion of the wheel shall not revolve in the outer portion when driving or braking force is applied, the outer surface of the inner portion is scalloped or corrugated as at 32, as is also the bottom 16 of the channeled ring 15 of the outer portion, and the corrugations of the said inner portion interproject those of the channel of the outer portion as shown.

In addition to having the tortuous space 24 between the inner and outer portions of the wheel filled with the oil 25, the spaces 33 outside the channel-iron ring 15 may also be filled as a supply to replace any leakage of oil from said space 24.

In Fig. 3 it will be seen that when the inner portion of the wheel rests down on the lower side of the outer portion, openings 34 (shaded solid black) are left between the bottom or trough portions of the corrugations 32 of said inner portion and the truly circular inner edge 35 of the channel-iron ring 15; so that by suction the oil 25 in the spaces 33 may be drawn into the tortuous space 24 as the wheel revolves.

Having thus described the invention, I claim:—

1. In a vehicle wheel, an outer rim portion having a channel in its inner peripheral surface, and an inner floating portion whose outer edge fits movably in said channel, the edge of the inner portion and the bottom of the channel of the outer portion being corrugated and spaced apart with the corrugations of one portion interprojecting those of the other portion, the space between the corrugations being filled with a free-moving substance, the two portions of the wheel being so arranged that when the inner portion is given the full limit of eccentric movement toward one side of the wheel the trough portions of the corrugations of said inner portion are withdrawn from the channel of the outer portion at the opposite side of the wheel.

2. In a vehicle wheel, an outer rim portion having a channel in its inner peripheral surface, and an inner floating portion whose outer edge fits movably in said channel, the edge of the inner portion and the bottom of the channel of the outer portion being corrugated and spaced apart with the corrugations of one portion interprojecting those of the other portion, the space between the corrugations being filled with a free-moving substance, the two portions of the wheel being so arranged that when the inner portion is moved to its limit toward one side of the wheel the trough portions of the corrugations of said inner portion are withdrawn from the channel of the outer portion at the opposite side of the wheel, and means carried by the wheel for storing a supply of the free-moving substance in communication with the openings formed by the withdrawal of said trough portions of the corrugations.

3. In a vehicle wheel, an outer rim portion having a channel formed in its inner peripheral surface, and an inner floating portion whose outer edge fits movably in said channel, the edge of the inner portion and the bottom surface of the channel of the outer portion being corrugated and spaced apart with the corrugations of the one portion interprojecting those of the other portion, the space between the corrugations being filled with a free-moving substance, there being an additional space provided in the outer portion of the wheel and filled with the free-moving substance, and means whereby movement of the inner portion of the wheel to eccentric position in the outer portion places the last-named space in communication with the space between the corrugations.

Witness my hand this 16 day of November, 1918.

AUGUST W. ALTHOFF.

Copies of this patent may be obtained for five cents each, by addressing the "Commissioner of Patents, Washington, D. C."